United States Patent [19]

Langenback et al.

[11] Patent Number: 5,335,923
[45] Date of Patent: Aug. 9, 1994

[54] SNOW PLOW DOLLY

[76] Inventors: John M. Langenback; Glenn L. Langenback, both of 15 Lakeway Dr., Pittsfield, Mass. 01201

[21] Appl. No.: 868
[22] Filed: Jan. 4, 1993
[51] Int. Cl.$^5$ .................. B62B 3/10; B66F 9/065
[52] U.S. Cl. .................. 280/79.11; 414/589; 269/17; 254/134
[58] Field of Search .............. 280/79.11, 79.3, 47.34, 280/35; 254/134; 269/17; 414/589, 590

[56] References Cited

U.S. PATENT DOCUMENTS

| | | | |
|---|---|---|---|
| 2,375,363 | 5/1945 | Hokanson | 211/13 |
| 3,132,875 | 5/1964 | Plumly | 280/47.34 |
| 3,318,466 | 5/1967 | Baxley | 214/1 |
| 3,941,400 | 3/1976 | Buttner | 280/79.1 |
| 3,949,976 | 4/1976 | Cofer | 254/134 X |
| 4,302,023 | 11/1981 | Kiesz | 280/43.24 |
| 4,572,531 | 2/1986 | Elia | 280/62 |
| 4,887,838 | 12/1989 | Reppen | 414/589 X |
| 5,009,406 | 4/1991 | McDermott | 269/17 |
| 5,050,898 | 9/1991 | Petrell, Jr. | 280/79.11 |
| 5,156,375 | 10/1992 | Liegel et al. | 254/134 |

Primary Examiner—Margaret A. Focarino
Assistant Examiner—Peter English
Attorney, Agent, or Firm—Norman B. Rainer

[57] ABSTRACT

A dolly specifically adapted to carry a snow plow blade having a mounting yoke and straight lower edge has a longitudinal beam elongated between front and rear extremities, a transverse beam orthogonally attached to the longitudinal beam and having an upwardly directed channel for receiving the straight lower edge of the plow blade, and a cross bar for supporting the mounting yoke. The cross bar is mounted atop a jack device which controls the elevation of the cross bar. Monodirectionally rotatable wheels are mounted beneath the extremities of the longitudinal beam. Omnidirectionally rotatable wheels are mounted beneath the extremities of the transverse beam.

4 Claims, 2 Drawing Sheets

SNOW PLOW DOLLY

BACKGROUND OF THE INVENTION

1. Field of the Invention

This invention relates to snow plows, and more particularly concerns a dolly adapted to support, transport and adjustably align a snowplow blade while dismounted from a plowing vehicle.

2. Description of the Prior Art

Snow plows are generally comprised of a horizontal elongated arcuate blade having an A-frame yoke support assembly which is engaged by a mounting bracket upon the plowing vehicle. The yoke generally has attachment means for a hydraulic lifting unit which is adapted to raise and lower the blade, thereby contacting the roadway and controlling the depth of swath plowed.

Numerous dollies have been disclosed in the prior art for supporting various types of agricultural, construction and industrial equipment, including snow plow blades. For example, U. S. Pat. No. 3,941,400 to Buttner discloses a dolly for a plow or other utility attachment having a connection yoke. It is comprised of an triangular horizontal framework having three wheels, a blade receiving member, and a vertically adjustable yoke supporting member. The Buttner dolly is adapted to be positioned beneath a suspended plow blade. The blade is then lowered upon the receiving member, and the yoke support is then raised to a position supporting the yoke. The plow blade may then be disconnected from its mounting brackets. The yoke may then be lowered to a position which is more stable for transport and storage. The position of the blade receiving member is located at one extremity of the dolly which, along with a three wheeled design, creates an unstable base for a plow. This may be quite dangerous, particularly in the case of larger blades which may weigh over 650 pounds. Moreover, the lifting mechanism consists of a pair of lifting screw means. Adjustment of yoke height by a single individual requires small incremental adjustments alternating between the two screw means in order to preclude tipping of the dolly. This process is time consuming and contributes to the instability of the design.

Another snow plow dolly is disclosed in U.S. Pat. No. 4,572,531 to Elia. This dolly suffers from similar design inadequacies to that of the Buttner dolly. Specifically it is comprised of a three wheeled base of T-shaped configuration. The plow blade rest, at the forward extremity, could allow the blade to tip forward when raised. The yoke supporting means consists of a bracket which is bolted to the base and is difficult to adjust. The user would have to reach under the A-frame in order to access the bolts. Even then some external lifting means would be necessary. Furthermore, both the aforesaid dollies present a small footprint area relative to the plow thereby contributing to an unstable condition.

It is therefore an object of the present invention to provide a plow blade dolly adapted to store and transport a dismounted snow plow blade.

It is another object of the present invention to provide a dolly of the aforesaid nature which provides a stable base of support.

It is a further object of this invention to provide a dolly of the aforesaid nature having a yoke supporting means which may be easily height-adjusted.

It is yet another object of this invention to provide a dolly of the aforesaid nature which is durable, capable of accommodating snow plow blades of varied design, and amenable to low cost manufacture.

These and other beneficial objects and advantages will be apparent from the following description.

SUMMARY OF THE INVENTION

The above and other beneficial objects and advantages are accomplished in accordance with the present invention by a plow blade dolly adapted to support and transport a plow blade dismounted from a vehicle, said plow blade comprised of an arcuate metal structure horizontally elongated between opposed lateral extremities and having a concave front surface, convex rear surface, and straight lower edge adapted to contact a roadway upon lowering of the plow blade, said plow blade having a support yoke having a forward extremity associated with the rear surface of said blade and a rear extremity adapted to be engaged by lifting means associated with a plowing vehicle, said dolly comprised of:

a) a longitudinal support beam horizontally elongated between front and rear extremities and having top and bottom surfaces, b) a transverse support beam horizontally elongated between outer extremities and symmetrically disposed about and perpendicular to said longitudinal support beam, said transverse support beam having a lower surface affixed to the upper surface of said longitudinal support beam at a point substantially equidistant of said front and rear extremities, said transverse support beam having an upper surface having an upwardly disposed receiving channel adapted to receive the lower edge of said plow blade, c) a jack disposed upon the top surface of said longitudinal support beam adjacent the rear extremity thereof, d) an elongated extension arm configured to engage and activate said jack, e) an elongated crossbar centrally supported by said jack and disposed in parallel relationship to said transverse support beam, said crossbar adapted to adjustably support said yoke, and f) four casters, each downwardly disposed from the lower surface of said front, rear and outer support beam extremities.

In a preferred embodiment, the longitudinal and transverse support beams may be fabricated from five inch wide channel iron, the channel upwardly disposed on said transverse member and downwardly disposed on said longitudinal member. The casters may be of the swivel type on the outer extremities and fixed axis type on said front and rear extremity.

The jack may be in the form of a conventional scissor type activated by a rotatable threaded rod. In alternative embodiments, a hand pump hydraulic jack may be used. In yet other embodiments, a hydraulic cylinder may be used having quick-disconnect line connectors to the hydraulic pump means of the plowing vehicle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
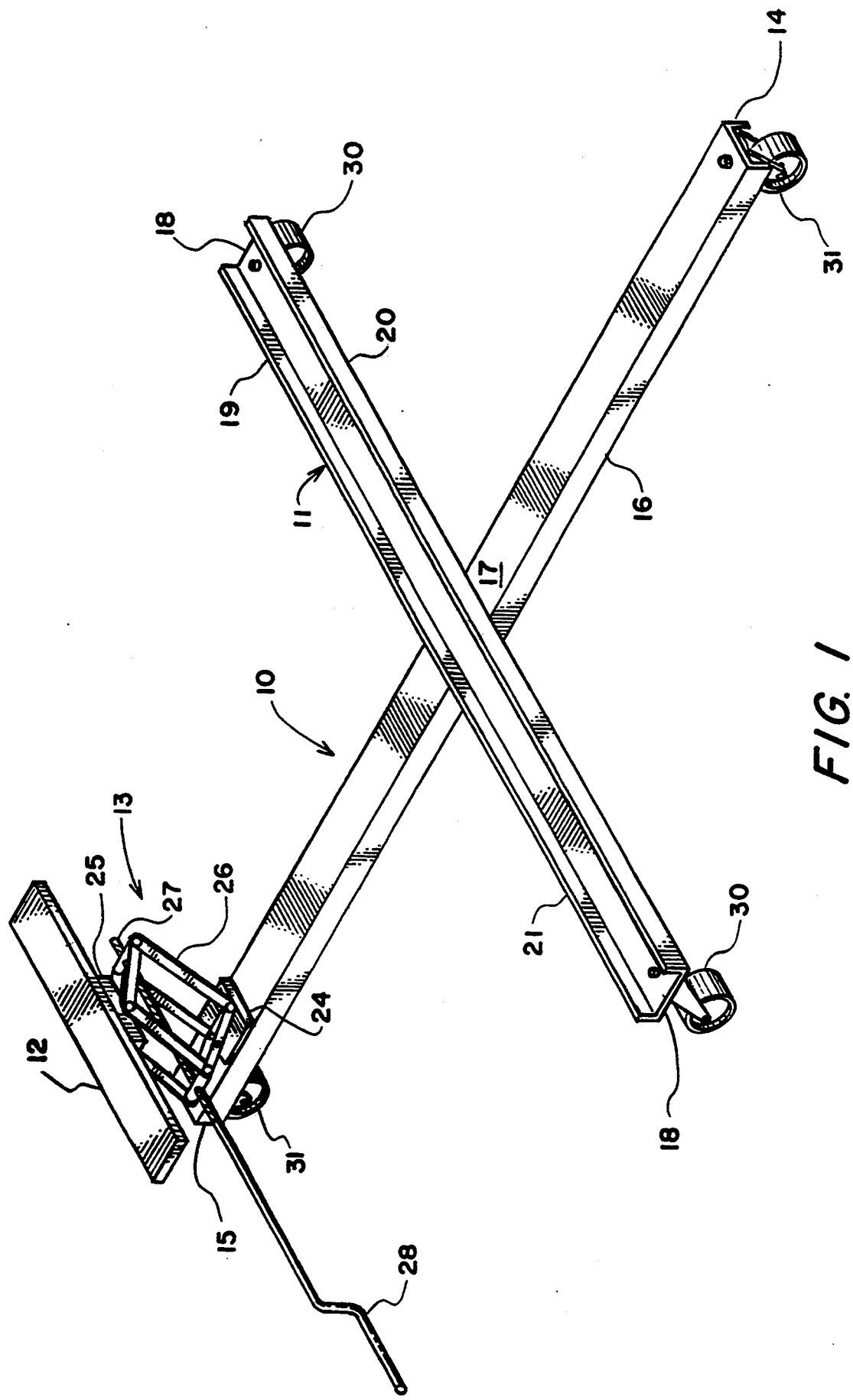
FIG. 1 is a top perspective view of an embodiment of the plow dolly of the present invention.
Figure 2:
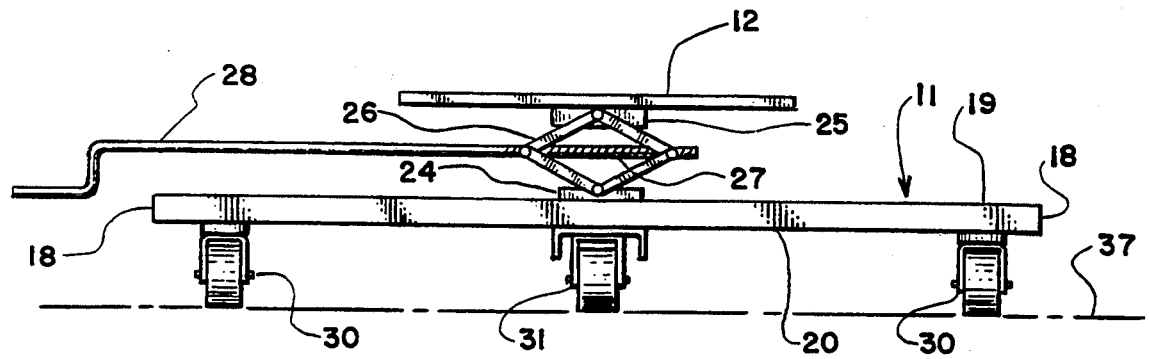
FIG. 2 is a front view of the embodiment of FIG. 1.
Figure 3:
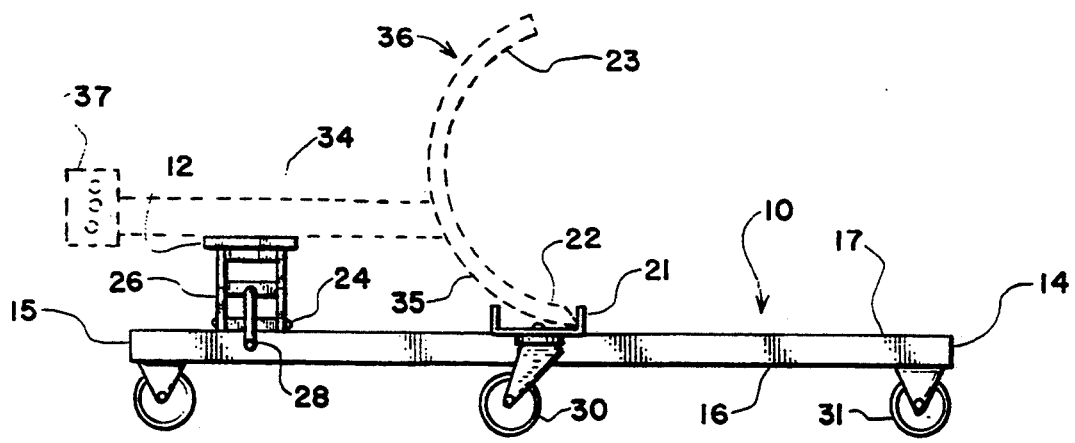
FIG. 3 is a side view of the embodiment of FIG. 1 shown in functional relationship with a snow plow blade.

Referring to FIGS. 1–3, an embodiment of the plow blade dolly of the present invention is shown comprised of orthogonally disposed longitudinal and transverse support beams, 10 and 11, respectively, and crossbar 12 mounted upon jack 13.

Longitudinal support beam 10 is shown comprised of a straight piece of C-cross section channel steel extending between front and rear extremities 14 and 15, respectively. The interior or channel-shaped side of the C-cross section is downwardly directed as bottom surface 16, and the opposed flat surface is designated top surface 17. Said longitudinal support beam may range in length between about 4 and 6 feet.

Transverse support beam 11, comprised of C-cross section steel, is elongated between outer extremities 18, and may be further characterized in having upper and lower surfaces 19 and 20, respectively, said upper surface being the interior of the C-cross section. Said transverse support beam is attached as by welding to top surface 17 of said longitudinal beam in a manner disposing the two beams in orthogonal relationship. The site of attachment is such as to represent the midpoints of both beams. The contour of said upper surface is such as to constitute a receiving channel 21 for retaining the lower edge 22 of snow plow blade 23. The length of transverse support beam 11, measured between said outer extremities, will range between about 6 and 7 feet. Accordingly, it is to be noted that beam 11 is preferably between about 20% and 40% longer than longitudinal beam 10. This provides improved support for the snow plow blade assembly 36.

The illustrated embodiment of jack 13 is comprised of a base plate 24, top plate 25, scissor arms 26 pivotably joined to said plates, and threaded control rod 27 which interacts with said scissor arms. Turning movement of control rod 27 causes elevational changes in the position of top plate 25 relative to base plate 24. An extension arm 28 is provided for engaging control rod 27 at a distance laterally displaced from said jack. Jack 13 is mounted, as by welding, upon top surface 17 of beam 10 at a distance of about one foot from rear extremity 15.

Cross bar 12 is mounted at its midpoint upon top plate 25 of said jack in an orientation parallel to beam 11. The length of cross bar 12 may range between about 2 and 4 feet, and is accordingly about 40% and 60% of the length of beam 11.

Downwardly directed swivel casters 30 are mounted upon lower surface 20 of beam 11 adjacent outer extremities 18. Downwardly directed fixed casters 31 are mounted upon bottom surface 16 of beam 10 adjacent extremities 14 and 15 and oriented to rotate in a vertical plane which passes through the centerline of beam 10. The aforesaid arrangement of one pair of stationary casters and one pair of swivelled casters provides controlled movement of the dolly, and minimizes "skating." The four wheels are dimensioned and positioned so as to ride evenly upon a flat floor surface 37.

In operation, a snow plow blade assembly 36 comprising elongated arcuate blade 23 having lower straight edge 22, and mounting frame 34 attached to convex rear surface 35 of blade 23 is caused to rest upon the dolly as shown in FIG. 3. It is to be noted that edge 22 resides within receiving channel 21, and frame 34 rests upon crossbar 12.

When it is desired to attach snow plow blade assembly 36 to the front of the plow truck, the assembly, resting upon the dolly is maneuvered into a position wherein mounting means 37 on frame 34 are vertically aligned with cooperating mounting means on the truck. The jack is then employed to cause mounting means 37 on frame 34 to achieve elevational alignment with interactive mounting means on the truck. Coupling of the blade assembly with the truck is then easily achieved by conventional securing means such as pegs, bolts, clamps, lockpins and the like. Once the snow plow blade assembly is secured to the truck jack 13 is manipulated downwardly, and the dolly is wheeled to a storage site.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A plow blade dolly adapted to support and transport a plow blade dismounted from a vehicle, said plow blade comprised of an arcuate metal structure horizontally elongated between opposed lateral extremities and having a concave front surface, convex rear surface, and straight lower edge adapted to contact a roadway upon lowering of the plow blade, said plow blade having a support yoke having a forward extremity attached to the rear surface of said blade and a rear extremity adapted to be engaged by lifting means associated with a plowing vehicle, said dolly comprised of:
    a) a longitudinal support beam horizontally elongated between front and rear extremities and having top and bottom surfaces,
    b) a transverse support beam horizontally elongated between outer extremities and symmetrically disposed about and perpendicular to said longitudinal support beam, said transverse support beam having a lower surface affixed to the top surface of said longitudinal support beam at a point substantially equidistant of said front and rear extremities, and having an upper surface provided with an upwardly directed receiving channel adapted to receive the lower edge of said plow blade,
    c) a jack disposed upon the top surface of said longitudinal support beam adjacent the rear extremity thereof,
    d) an elongated extension arm configured to engage and activate said jack,
    e) an elongated crossbar centrally supported by said jack and disposed in parallel relationship to said transverse support beam, said crossbar adapted to adjustably support said yoke, and
    f) four caster wheels, each downwardly disposed from the lower surface of one of said front, rear and outer support beam extremities, respectively, and adapted to roll upon the same plane.

2. The dolly of claim 1 wherein the caster wheels on said outer extremities are mounted in a swivelled manner, permitting omnidirectional rotation of said wheels, and the caster wheels on said front and rear extremities are constrained to rotational movement within a vertical plane that includes the axis of elongation of said longitudinal support beam.

3. The dolly of claim 2 wherein said jack is of scissor configuration activated by a rotatable threaded rod.

4. The dolly of claim 2 wherein said transverse support beam is between 20% and 40% longer than said longitudinal support beam.

* * * * *